United States Patent [19]

Coble

[11] Patent Number: 5,447,349
[45] Date of Patent: Sep. 5, 1995

[54] AUXILIARY HANDLE FOR SHOVELS

[76] Inventor: Lloyd B. Coble, 378 Kelley Rd., Big Flats, N.Y. 14814

[21] Appl. No.: 262,510

[22] Filed: Jun. 20, 1994

[51] Int. Cl.⁶ .............................. A01B 1/22; B25G 3/38
[52] U.S. Cl. ...................................... 294/58; 16/114 R
[58] Field of Search ......................... 294/54.5, 57–59; 15/144.1–144.4, 145; 16/112, 114 R, 115, 111 R; 37/265, 285; 254/131.5

[56] References Cited

U.S. PATENT DOCUMENTS

| 911,291 | 2/1909 | Byor | 294/58 |
|---|---|---|---|
| 1,374,061 | 4/1921 | Coleman | 294/58 |
| 2,531,227 | 11/1950 | Lubins | 294/58 |
| 2,772,910 | 12/1956 | Doyle | 294/58 |
| 3,751,094 | 8/1973 | Bohler | 294/58 |
| 4,050,728 | 9/1977 | Davidson | 294/58 |
| 4,264,096 | 4/1981 | Barrnett | 294/58 |
| 4,787,661 | 11/1988 | Rutledge | 294/58 |
| 4,944,541 | 7/1990 | Waldschmidt | 294/58 |
| 5,331,720 | 7/1994 | Beckingham | 294/58 X |

FOREIGN PATENT DOCUMENTS

| 634050 | 7/1963 | Belgium | 294/58 |
|---|---|---|---|
| 948860 | 8/1949 | France | 294/58 |
| 1109731 | 2/1956 | France | 294/58 |
| 915288 | 1/1963 | United Kingdom | 294/58 |
| 2156641 | 10/1985 | United Kingdom | 294/58 |

Primary Examiner—Johnny D. Cherry
Attorney, Agent, or Firm—Barnard, Brown & Michaels

[57] ABSTRACT

An auxiliary handle for shovels or the like having a shaft with an adjustable length, a clamp for attachment to the shaft of a conventional shovel near the blade, and a swivel linkage connecting the shaft to the clamp, which allows full swiveling of the auxiliary handle relative to the shaft of the shovel. Load, lift and discharge assistance provided by this handle minimizes back exertion during shovel operations.

6 Claims, 3 Drawing Sheets

AUXILIARY HANDLE FOR SHOVELS

FIELD OF THE INVENTION

The invention pertains to the field of digging: tools. More particularly, the invention pertains to handles for lifting tools that require extensive back effort for general operation, such as shovels, scoops, forks and the like.

BACKGROUND OF THE INVENTION

1. References Cited 2,531,227 11/1950 Lubins
2,772,910 12/1956 Doyle
3,751,094 8/1973 Bohler
4,050,728 9/1977 Davidsort
4,264,096 4/1981 Barnett
4,787,661 11/1988 Rutledge
4,944,541 7/1990 Waldschmidt 2. Discussion of the Prior Art Although this invention is described herein in terms of "shovels", it will be recognized by one skilled in the art that it is equally applicable to other similar digging or lifting tools such as pitchforks, scoops, spades, rakes, hoes, etc.

The single-handled shovel has been in existence for many years. Simple, inexpensive, and versatile, this manually-operated ;Lifting tool comes in a variety of forms and sizes, and serves a multitude of industries. Though successful in the marketplace, the single-handled shovel by its design inevitably places the operator at risk of back-related injuries.

Designed to load, lift, and discharge loose material from a location near the ground, the typical single-handled shovel consists of a blade that is attached to a long shaft. The shaft is commonly referred to as a handle, but in the following discussion the term "shaft" will be used to distinguish the elongated shaft portion of the shovel from the auxiliary handle of the invention, and from the "D" shaped handle which is often provided at the opposite end of the shaft from the shovel blade (particularly in snow shovels, pitchforks or the like).

The shaft is grasped by the operator with both hands to control displacement of the material that is accumulated within the contour of the blade. In the load phase of the shovel cycle where material is difficult to accumulate (scoop) and/or heavy, inadequate blade control leverage warrants placement of a hand near the blade, and consequently, deviation from an upright position. The load-accumulating scoop, or thrust of the blade into the material positions the loaded blade away from the body.

Here begins the lift phase whereby the operator, already bent over to improve lifting leverage, proceeds to simultaneously raise and reposition the loaded blade closer to the body. Lifting ceases when the operator proceeds to a posture sufficient for meeting discharge direction arid distance requirements. With a jerk of the arms and/or a twist of the back, the material slides off the blade, thus completing the shovel cycle.

Back effort can be minimized in a manual shoveling application if the operator can use the shovel while in a near or fully upright posture. This is the underlying principle in existing shovel designs that feature a bent single shaft (such as the Rugg Back-Savers), or those with a concave blade surface best suited for plow operations.

There have been patents issued over the years that claim reduction of shoveling back effort through use of an auxiliary handle. Such designs, however, have limitations that restrict or preclude market potential.

Doyle, U.S. Pat. No. 2,772,910, and Barnett, U.S. Pat. No. 4,264,096 show auxiliary handles of fixed length which cannot be adjusted to accommodate various shovel handle lengths, operator arm lengths and shoveling applications.

Lubins, U.S. Pat. No. 2,531,227, Bohler, U.S. Pat. No. 3,751,094, and Waldschmidt, U.S. Pat. No. 4,944,541 embody adjustable length in flexible positioning of the auxiliary handle, but incur a penalty of lower mechanical advantage.. These patents also demonstrate a limited range of auxiliary handle motion, and subsequently an awkward and/or uncomfortable shoveling operation.

In addition to featuring a complex clamping configuration, Davidson, U.S. Pat. No. 4,050,728 also claims a universal joint that makes a certain range of planar movement impossible.

Davidson, Barnett, Waldschmidt and Rutledge (U.S. Pat. No. 4,787,661) require modifications to the shovel for which the auxiliary handle is being attached.

Auxiliary handles featured in Barnett and Rutledge cannot be transferred to another shovel.

Lubins, Doyle and Davidson have no apparent feature to prevent slippage of the auxiliary handle clamp configuration relative to the shovel shaft.

SUMMARY OF THE INVENTION

The invention comprises an auxiliary handle for shovels or the like providing ergonomic shoveling capacity, simplified part construction, ease of installation and disassembly, and compatibility with past and present straight, single-handled shovel designs. An auxiliary handle having adjustable length is attached to the shaft of the shovel near the blade by a clamp which allows full swiveling of the auxiliary handle relative to the shaft of the shovel.

OBJECTS OF THE INVENTION

An object of this invention is to provide an auxiliary handle that is fastened to a conventional shovel by a connection that permits auxiliary handle movement in all planes applicable to shovel operations. Unrestricted auxiliary handle positioning is essential to shoveling in a substantially upright posture.

Another object of this invention is to provide an auxiliary handle of adjustable length to compensate for variation in operator arm length, existing shovel handle length, or extent of task. This feature ensures grasping of the auxiliary handle while maintaining a substantially upright posture.

Another object of this invention is to provide an auxiliary handle that is readily attachable to a conventional shovel. Designed to complement existing art, the auxiliary handle is permanently or temporarily secured to a wide range of conventional shovel handles by an easy-to-install clamping configuration. Embodied in the clamping configuration is attachment to a wide array of handle diameters, with frictionally secure fastening relative to the handle.

Another object of this invention is to provide an auxiliary handle that requires no modifications to the conventional shovel to which it is attached.

A final object of this invention is to provide an auxiliary handle that, by means of an attached clip, can be secured to the conventional shovel when not in service.

DESCRIPTION OF THE PREFERRED EMBODIMENT

The conventional snow shovel to which the auxiliary handle of the invention may be attached comprises a blade (42), shaft (40) and D-handle (44). As noted above, while this invention will be shown and described herein in terms of "shovels", it will be recognized by one skilled in the art that it is equally applicable to other similar digging or lifting tools such as pitchforks, scoops, spades, rakes, hoes, etc.

Figure 1:
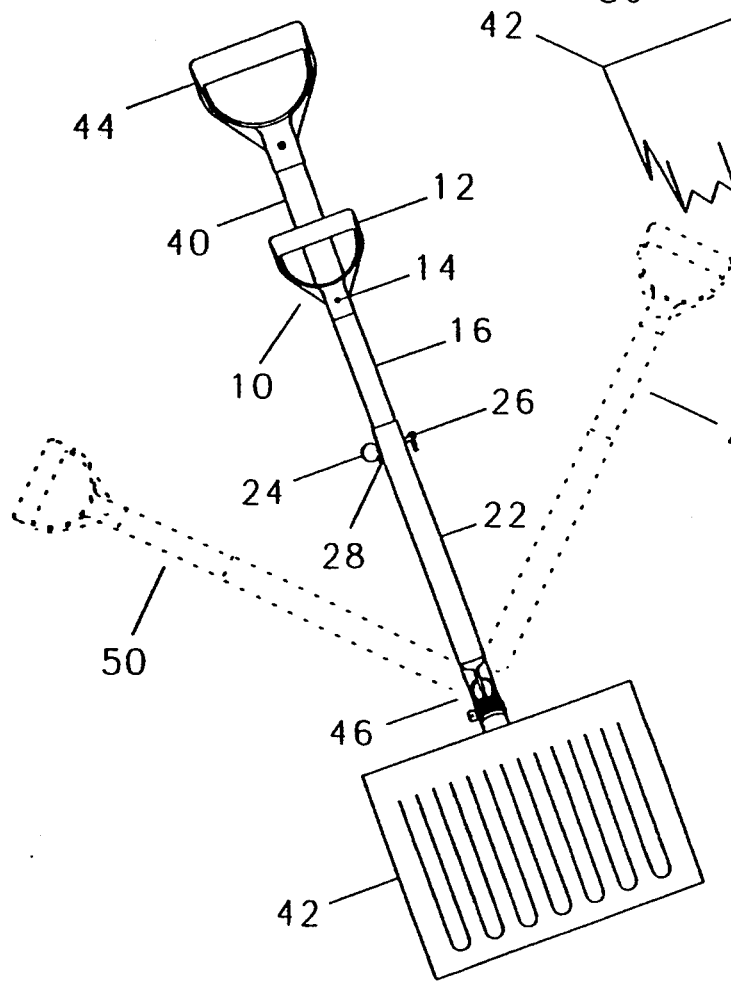
FIG. 1 is a perspective view of the auxiliary handle of the invention mounted to a conventional snow shovel.
Figure 3A:
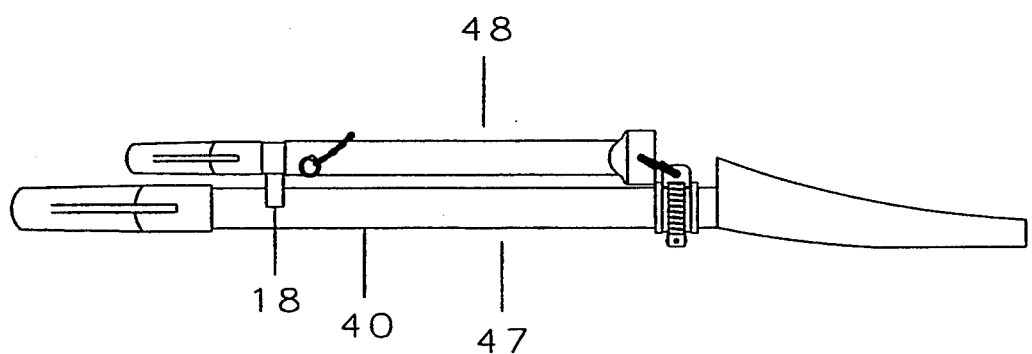
FIGS. 3a and 3b are a side view of the auxiliary handle mounted to a conventional shovel.
Figure 3B:
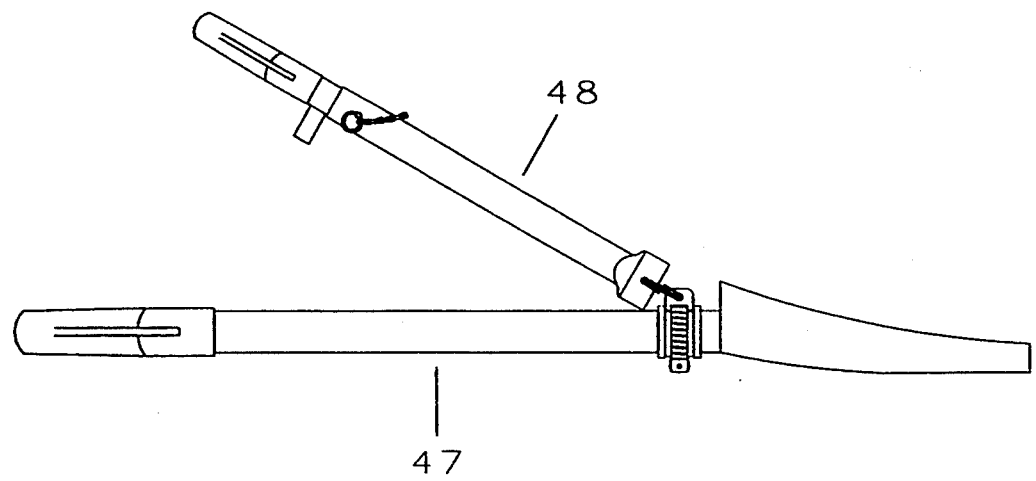

FIG. 1 shows the auxiliary handle of the invention as it would be attached to a conventional snow shovel. The auxiliary handle comprises a telescoping shaft (10), having a D-handle (12) at one end, and a swiveling linkage (46) at the other end. The swiveling linkage is attached to the shovel shaft (40) near the blade (42) using a clamp arrangement to be discussed below. The attachment of the auxiliary handle (FIGS. 3a and 3b, (48)) to the shovel (FIGS. 3a and 3b, (47)) using a swivel linkage allows the auxiliary handle (48) to be freely moved to a variety of positions from side to side (FIG. 1, dotted lines (49) and (50)) and from its operational position shown in FIG. 3b to a stored position parallel to the shovel shaft (40) as shown in FIG. 3a.

Figure 4:
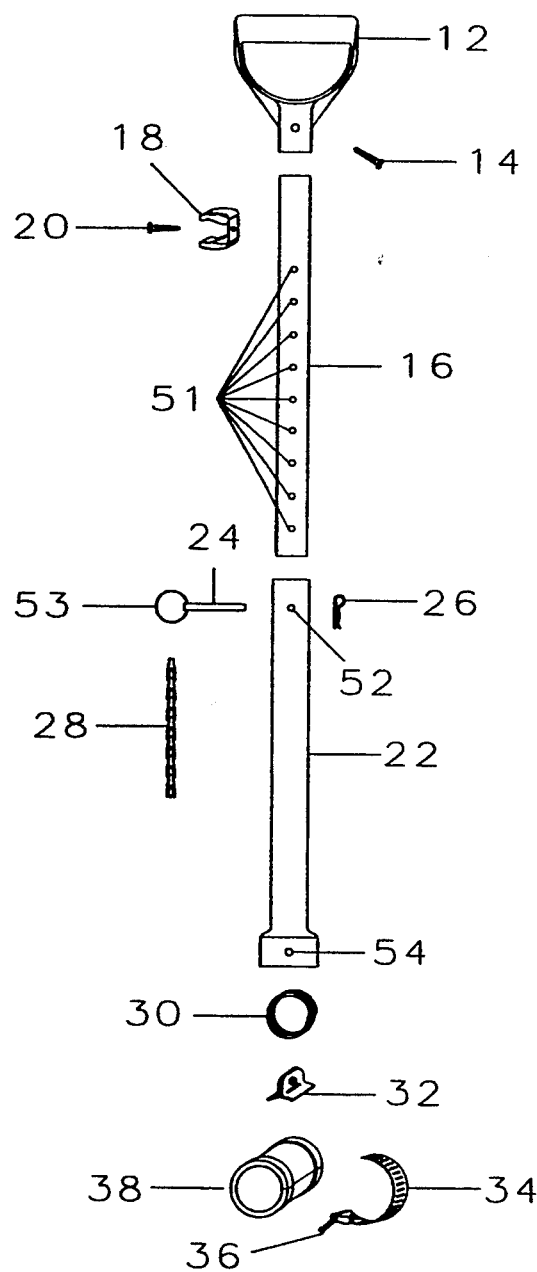
FIG. 4 is an exploded view of the auxiliary handle components.

As shown in exploded FIG. 4, the telescoping shaft (10) of the auxiliary handle comprises an upper tubular member (16) and lower tubular member (22) which fit together, one inside the other, along much of their lengths. A D-grip handle (12) is attached to one end of the upper tubular member (16), and held in place with a fastener such as screw (14) or rivet, or if desired, it may be adhesively attached or formed into the upper tubular member (16). A spring clip (18) is fastened to the upper tubular member (16) just below the D-grip handle (12), and held in place with a screw (20). The spring clip (18) is aligned to permit the auxiliary handle (48) to be secured to the shovel shaft (40) when the shovel (47) is in storage as shown in FIG. 3a.

The upper tubular member (16) is inserted in the open end of the lower tubular member (22) and the two are linked together by a pin (24) passing through a pair of holes (52) in the lower tubular member (22), and through one of a plurality of holes (51) provided along the length of the upper tubular member (16). A cotter pin (26) is inserted through a hole in the end of the pin (24) to prevent disengagement during service. Pin (24) has a ring (53) on the end to facilitate removal, and to secure one end of a lanyard (28). The other end of the lanyard (28) is secured to the eye of the cotter pin (26), and/or cotter pin (26) during auxiliary handle shaft adjustment.

The shaft of the auxiliary handle (48) may thus be easily adjusted in length by removal of the ring pin (24) from the holes (51) and (52), sliding the upper (16) and lower (22) tubular members until the handle is the desired length and until holes (52) are aligned with a set of holes (51), and then reinserting the pin (24) and securing it with the cotter pin (26).

Alternatively, the means for locking the two tubular members relative to each other could be as simple as splitting the end of the outer (lower) tubular member, and placing a hose clamp over the split end. As the hose clamp is tightened, the split end will compress on the inner (upper) tubular member and hold it in place. Similarly, there are compression fittings such as are commonly used on tripod legs which would permit the relative positions of the upper and lower tubular members to be locked using rings or levers.

It will be understood by one skilled in the art that the functions of the upper (16) and lower (22) tubular members may be reversed within the teachings of the invention. That is, the upper tubular member can be the one with a single pair of holes (52), and the upper tubular member could be the one which fits outside the lower, or any combination of these.

Additionally, it will be understood by one skilled in the art that the term "tubular member" implies hollow, and in the context of this invention, one of the two telescoping members referenced as a tubular member can be a rod or solid shaft. Accordingly, the telescoping shaft (10) of the, auxiliary handle (48) can comprise an upper rod (16) and lower tube (22), or an upper tube (16) and lower rod (22).

Figure 2:
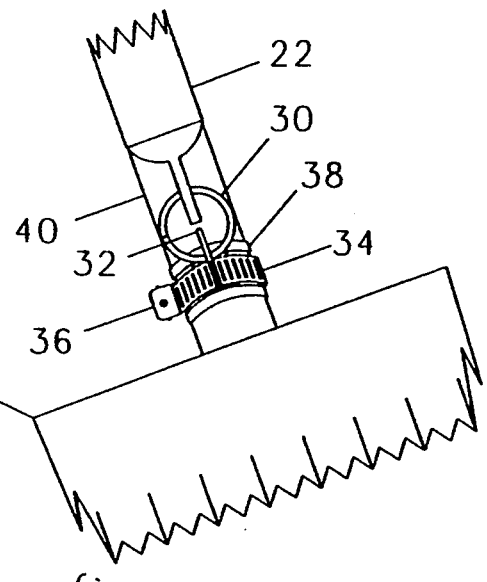
FIG. 2 shows a detail of the clamping configuration that permits attachment of the auxiliary handle to the conventional shovel.
Figure 5:
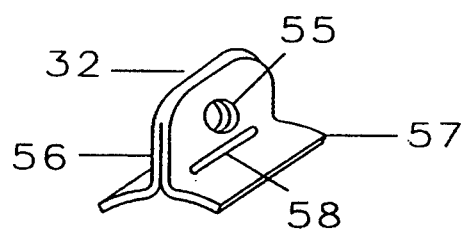
FIG. 5 is a detail view of the handle attachment clip.

Swivel linkage (46), as detailed in FIGS. 2 and 5, comprises the components that link the auxiliary handle (48) of the invention to the shovel shaft (40).

The end of the lower tubular member (22) opposite the end that receives the upper tubular member (16) is flattened and pierced to form a hole (54). A split ring (30) is inserted through the lower tubular member (22) end hole (54).

FIG. 5 shows the details of the lift-eye clip. The lift-eye clip (32) is in the shape of an inverted "T". The vertical portion (56) of the "T" has a hole (55) through which the split ring (30) passes, to form the swivel coupling. The horizontal portion (57) of the "T" may be shaped to follow the curvature of the shovel shaft (40).

The clamping arrangement serves to attach the lift-eye clip (32) to the shovel shaft (40), thereby attaching the auxiliary handle (48) to the shovel (47). The clamp comprises a band (34) that is inserted through a slot (58) at the base of the lift-eye clip (32), wrapped around the shovel shaft (40), and inserted into an attached screw-thread housing (36). The screw is turned, causing the band (34) to advance, and in the process, forming a closed loop. Preferably, the band (34) and screw-thread housing (36) are a stainless-steel hose clamp of sufficient length to surround the largest shovel shaft (40) likely to be encountered.

Referring to the clamping arrangement in FIG. 2, an open flexible collar (38) of resilient material is placed on the shovel shaft (40) to serve as a minimal slip mounting base for the fully tightened band (34). Preferably, the collar (38) is formed with a "U" shaped cross-section to retain the, band (34) centered on the collar (38). The flexible collar (38) is placed as close as possible to the shovel blade (42) for optimum mechanical advantage. The band is placed within the retaining channel of the flexible collar (38), and the screw within the screw-thread housing (36) is tightened until the lift-eye clip (32) is firmly secured to the shovel shaft (40).

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

I claim:

1. An auxiliary handle for a shovel, the shovel comprising a shaft having a blade at one end, the auxiliary handle comprising:
   a) a telescoping shaft having upper and lower ends and an adjustable length therebetween,
   b) clamp means for clamping to the shaft of the shovel comprising:
      i) a flexible collar of resilient material having sufficient length to wrap around a substantial portion of the circumference of the shaft of the shovel,
      ii) band means for surrounding the flexible collar, having two ends and sufficient length therebetween such that when the flexible collar is wrapped around the shaft, and the band means is wrapped around the outside of the flexible collar, the ends of the band means overlap,
      iii) screw means for drawing the ends of the band means over each other such that the band means is drawn tight over the flexible collar, compressing the flexible collar tightly over the shaft of the shovel,
   c) swivel linkage means for rotatably attaching the shaft of the auxiliary handle to the clamp means, attached to the lower end of the telescoping shaft and to the clamp means, such that when the clamp means is clamped to the shaft of the shovel near the blade, the auxiliary handle is attached to the shaft of the shovel while remaining free to swivel freely on the swivel linkage means,
   d) the swivel linkage means comprising:
      i) hole means for receiving a ring formed in the lower end of the telescoping shaft,
      ii) a lift-eye clip attached to the clamp means in the form of an inverted "T" having intersecting vertical and horizontal portions, having a hole for receiving a ring in the vertical portion of the "T", and having a slot located proximate to the intersection of the vertical and horizontal portions of the "T",
      iii) a ring inserted through the hole means formed in the lower end of the telescoping shaft and through the hole in the lift-eye clip, and the band means of the clamping means passes through the slot located proximate to the intersection of the vertical and horizontal portions of the "T" of the lift-eye clip, such that when the band means is drawn tight, the lift-eye clip is held firmly to the clamping means.

2. The auxiliary handle of claim 1 further comprising D-handle means on the end of the telescoping shaft opposite the swivel linkage means.

3. The auxiliary handle of claim 1 in which the telescoping shaft comprises:
   a) an upper cylindrical member, and
   b) a lower cylindrical member, the upper and lower cylindrical members interfitting to slide lengthwise one within the other such that the total length of the telescoping shaft may be adjusted by sliding the upper and lower cylindrical members relative to each other,
   c) locking means for locking the upper and lower cylindrical members in place relative to each other.

4. The auxiliary handle of claim 3 in which the locking means comprises
   a) a plurality of holes arranged in pairs along the length of one of the upper or lower cylindrical member, each pair of holes being on opposite sides of the cylindrical member such that a straight pin can be inserted through both holes,
   b) a pair of holes in the other cylindrical member, on opposite sides of the cylindrical member such that a straight pin can be inserted through both holes,
   c) a pin of sufficient length such that when it is inserted through one of the pairs of the plurality of holes in one cylindrical member and through the pair of holes in the other cylindrical member, the two cylindrical members will be locked in place lengthwise relative to each other.

5. The auxiliary handle of claim 3 in which either the upper or lower cylindrical member is a hollow tube, and the remaining cylindrical member is a solid shaft fitting inside the hollow tube.

6. The auxiliary handle of claim 1, further comprising spring clip means attached to the telescoping shaft for fastening the auxiliary handle to the shovel when it is not in service.

* * * * *